J. KOENIG.
SAFETY DEVICE FOR PIPING.
APPLICATION FILED MAY 15, 1907.
945,552.
Patented Jan. 4, 1910.
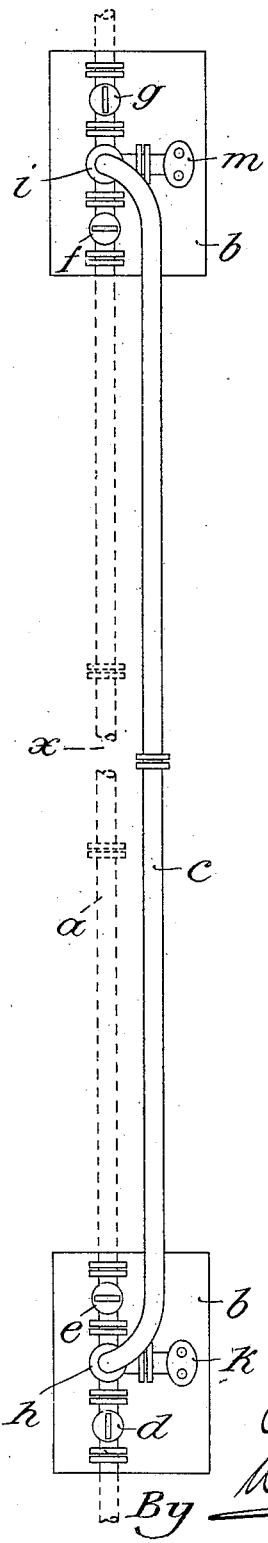
Witnesses:
O. F. Nagle.
L. Douville.
Inventor.
Johann Koenig.
By Wiederscheim & Fairbanks
Attorneys.

UNITED STATES PATENT OFFICE.

JOHANN KOENIG, OF RIGA, RUSSIA, ASSIGNOR OF ONE-HALF TO EMIL WITZENMANN, OF PFORZHEIM, GERMANY.

SAFETY DEVICE FOR PIPING.

945,552. Specification of Letters Patent. Patented Jan. 4, 1910.

Application filed May 15, 1907. Serial No. 373,847.

*To all whom it may concern:*

Be it known that I, JOHANN KOENIG, a subject of the King of Bavaria, residing at 97 Alexanderstrasse, Riga, Russia, have invented new and useful Improvements in Safety Devices for Piping, of which the following is a specification.

My invention relates to means for remedying in rapid and simple manner the inconveniences attending bursting of a water- or other pipe. For this purpose devices are provided, whereby the defective part of the pipe is cut out by means of a branch-pipe. According to my invention I place in lines of piping pairs of valves with a junction casing between the members of each pair of valves, the junction casing being adapted to be connected to a branch pipe in the event of the main pipe bursting. Each junction casing is also provided with means for connecting it to a hydrant.

The invention is illustrated in the accompanying drawing, in which the figure is a plan.

$a$ is a portion of the piping, $b$ $b$ are two man-holes located at certain distances apart and containing the devices for connecting a branch-pipe $c$. The devices consist of pairs of valves $d$ $e$, $f$ $g$, with a casing $h$, $i$, between each pair, for connecting the branch $c$.

Assuming that a pipe has burst at $x$, the four valves $d$ $e$, $f$ $g$ must be closed and the branch $c$ connected to the flanges of the casings $h$, $i$. The valves $d, g$, can now be opened again, the burst pipe being thus cut out and the passage of flow in the piping maintained through the branch-pipe $c$.

In the drawing, the casings $h$, $i$ between the valve $d$ $e$, $f$ $g$ are shown as being provided each with an additional flange $k$, $m$, for connecting a hydrant.

The branch-pipe $c$ may be an ordinary rigid pipe, or a flexible metal pipe. The valves may be of any suitable description whatever, whether with lifting or sliding action, cocks, or the like.

Having thus described my invention, what I claim as new and desire to secure by Letters Patent is:—

The combination with a continuous pipe, of pairs of valves in said pipe, a casing between the members of each pair of valves, and a branch pipe connectible with said casings in case of bursting of the first-named pipe, each casing being provided with means for connecting a hydrant.

In witness whereof I have hereunto signed my name this 29th day of April 1907, in the presence of two subscribing witnesses.

JOHANN KOENIG.

Witnesses:
 EMIL WITZENMANN,
 ADOLPH WITZENMANN.